United States Patent [19]

Hochmuth

[11] 4,039,295
[45] Aug. 2, 1977

[54] GROOVE CUTTER

[76] Inventor: Erwin Hochmuth, Haydnstrasse 31, 7032 Sindelfingen, Germany

[21] Appl. No.: 675,878

[22] Filed: Apr. 12, 1976

[30] Foreign Application Priority Data

Apr. 12, 1975 United Kingdom ............... 2516110

[51] Int. Cl.² ................... B26D 1/12; B23B 51/00
[52] U.S. Cl. ................... 29/105 A; 408/186
[58] Field of Search ............ 29/103, 103 A, 105, 29/105 A; 408/186

[56] References Cited

U.S. PATENT DOCUMENTS

| 180,561 | 8/1976 | Duffy | 408/186 |
|---|---|---|---|
| 1,460,030 | 6/1923 | Mattson | 29/105 A |
| 2,385,750 | 9/1945 | Weddell | 29/105 A |
| 2,395,628 | 2/1946 | Kocher | 408/186 |
| 2,400,856 | 5/1946 | Thompson | 29/105 A |
| 2,411,697 | 11/1946 | Smith | 408/186 |
| 2,477,482 | 7/1949 | Florin | 29/105 A |
| 3,827,119 | 8/1974 | Bennett | 29/103 A |
| 3,859,700 | 1/1975 | Jilbert | 29/103 A |

Primary Examiner—Harrison L. Hinson
Attorney, Agent, or Firm—Walter Becker

[57] ABSTRACT

A cutting tool, especially for cutting grooves, which has a shank at one end and a head at the other end with a diametral axial slot extending into the tool from the head end. A pair of overlapping plates having means on the outer ends for supporting cutting elements are fitted into the slot and abut respective shoulders at the axially inner end of the slot. A clamp screw draws the head tight against the plates while other screws threaded angularly into the head engage the plates and hold the plates in engagement with the respective shoulders.

8 Claims, 4 Drawing Figures

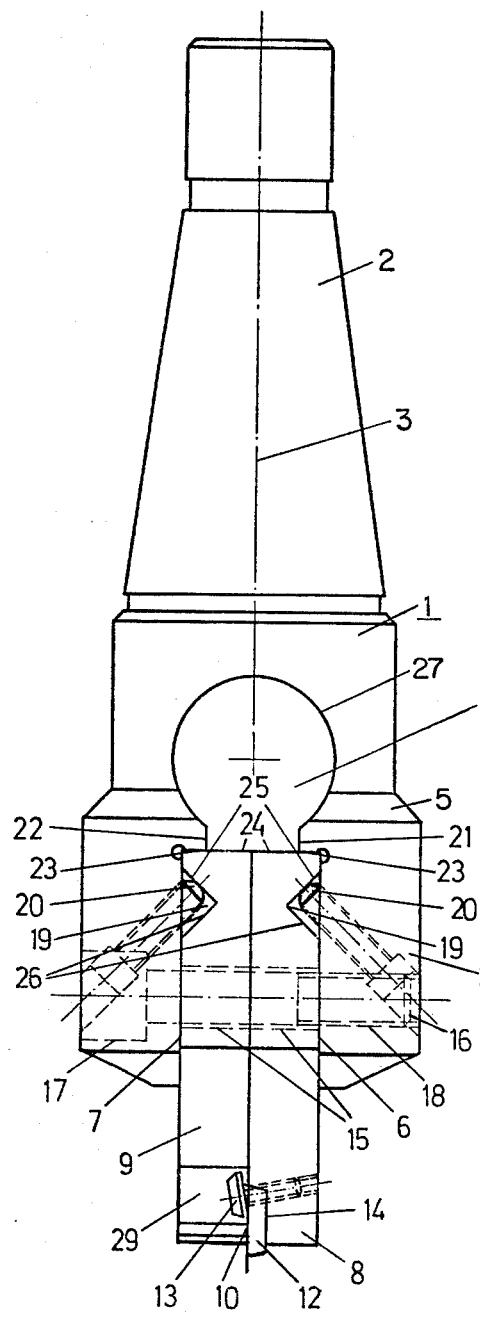
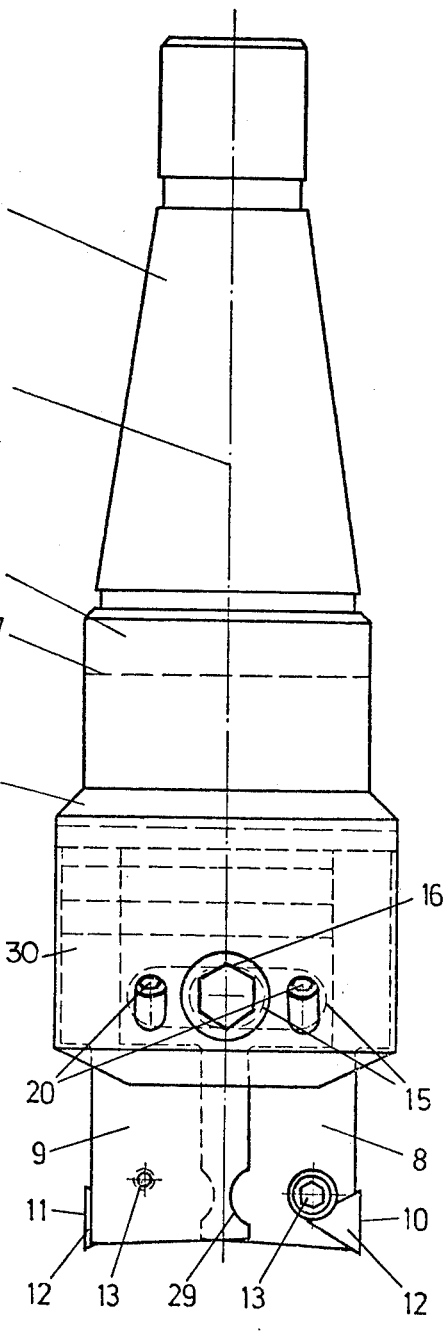

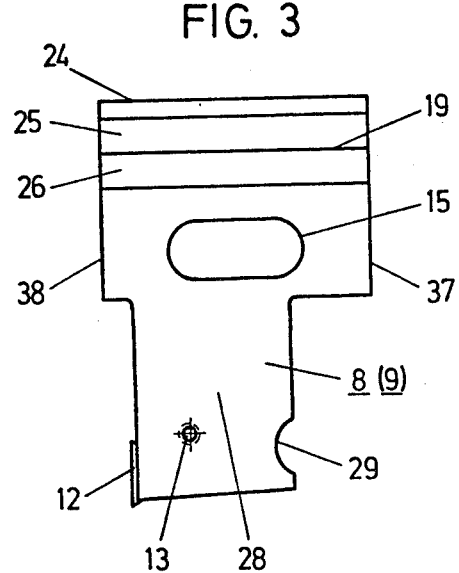
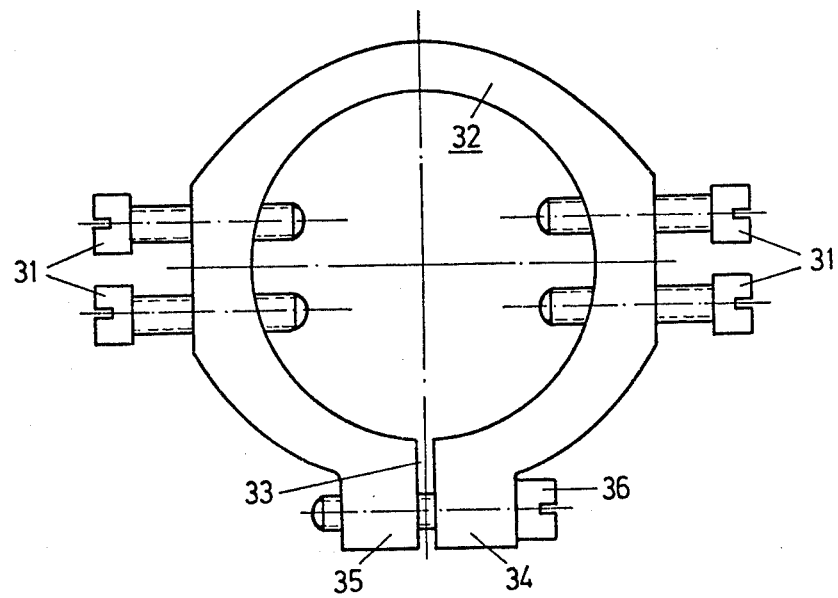

GROOVE CUTTER

The present invention relates to a groove cutter with a recess provided in a milling body and extending at a right angle to the axis of the miller or cutter. Located in the recess and radially adjustable therein are two blade holders wich are arranged diametrically with regard to each other and are adapted to be clamped fast radially and axially by means of screws in the recess between plane surface.

Shank-type groove cutters designed as two-blade cutters are usually, in view of standardized size gradations, non-variably designed for certain groove widths. When groove widths are involved which do not corresponds to the respective standardized size, it is necessary in order to prepare the groove successively to mill from the workpiece two adjacent paths in which instance a correspondingly longer time is needed and the shank during its advance in radial direction is partially intermittently under load.

Belgian Pat. No. 722,229 discloses a tool with the above mentioned features which, when employing suitably shaped blades, can also be used for milling grooves. Since, however, the two blade holders with a dovetailed foot portion in the recess of the tool head follow each other lengthwise, the adjustment of the blade holders, especially when narrow groove widths are involved, can be effected only in very narrow limits.

According to U.S. Pat. No. 3,646,650 it is known, to purposes of together clamping the two blade inserts in the tool head, to provide a shank-type groove cutter which is designed as two-blade cutter with a fork slot for receiving the blade inserts and with a clamping screw which vertically crosses the tool axis.

It is an object of the present invention to provide a groove cutter of the above described general character, in which by simple means the adjusting range of the blade holders is considerably increased while at the same time for obtaining narrow milling tolerances, locking of the blade holders is improved.

This object and other objects and advantages of the invention will appear more clearly from the following specification in connection with the accompanying drawings, in which:

FIG. 1 is a side view of a groove cutter according to the invention.

FIG. 2 shows the groove cutter of FIG. 1 but turned by an angle of 90° about its longitudinal axis.

FIG. 3 shows one of the two identical blade holders of the groove cutter according to the invention.

FIG. 4 is a top view of an adjusting or setting ring adapted to be placed upon the groove cutter according to the invention.

The groove cutter according to the present invention is characterized primarily in that the recess in the base body of the cutter comprises a fork slot wich is adapted to be narrowed by a centrally arranged clamping screw, and is furthermore characterized in that the blade holders are designed as plates which engage each other along their broad side and each of which is provided with an oblong hole for permitting passage of the clamping screw therethrough. Each of these plates is within the region of its outer broad side end facing toward the cutter shank provided with a groove which extends at a right angle to the cutter axis. Two clamping screws each arranged in the cutter body at an incline to the cutter axis are adapted to be screwed against the surfaces of the grooves in order to press the blade holder plated against axial abutment surfaces of steps provided in the base body of the cutter.

To press on and loosen the two plane clamping surfaces of the fork-shaped divided tool heat, only a very slight stroke is needed. Since, in addition thereto, the rear region of the recess of the tool head remains free, in spite of the precise adjusting possibility, for the two blades, a particularly good clamping effect of the clamping surfaces is realized. This is also necessary because the adjusting direction of the blades with the type of groove cutter involved coincides with the direction of the tool feed. The additional locking possibility created for each blade holder by the pressing screws, the transverse groove and the step will for the respective blade secure a precise position along the tool axis and will prevent the blade holders during the cutting operation from being even only slightly pivoted about the clamping screw.

To be able for reasons of tolerance to make the contacting surface between the two blade holders as large as possible while nevertheless permitting a wide adjusting range for different groove widths, the two plate-shaped blade holders have, in conformity with ad advantageous design according to the invention, integrally connected thereto an outer section which is narrower than the tool head and which projects from the end face of the tool head while extending at opposite sides of the tool axis.

According to a particularly advantageous feature of the invention, the transverse groove of each blade holder is located close to the inner end of the blade holder in spaced relationship to the oblong hole for the clamping so that the pressing screws will considerably aid in the clamping effect of the clamping screw.

Referring now to the drawings in detail, the shank 1 of the groove cutter has one end thereof provided with a chucking cone 2. The other end of the cutter comprises a tool head 5 which is divided in a fork-like manner by a recess 4 extending transverse to the tool axis 3. The plate-shaped blade holders 8 and 9 which are clamped between the two plane clamping surfaces 6 and 7 of the tool head 5 are structurally identical, engage each other along their broad sides within the region of the tool axis 3 and are so adjusted that the two working edges 10 and 11 correspond to two mantle lines of a body of revolution which are offset relative to each other by half a revolution.

As exhangeable blades 12 there are used three-edge reversible plates of hard metal. These plates are held stationary in a precisely fitting depression 14 by means of the head rim of a holding screw 13 which is screwed at an incline into the blade holders 8 and 9. For the clamping screw 16, which is intended to clamp the blade holders 8 and 9 fast and which crosses tthe tool axis 3 at a 90° angle and extends through one oblong hole 15 each of the blade holders 8 and 9, there is provided a blind hole 17 in one section of the tool head 5 which is divided in a fork-like manner, whereas in the other section of the tool head 5 there is provided a threaded bore 18.

To prevent the working edges 10 and 11 from vibrating during a cutting operation, the two blade holders 8 and 9 are adapted respectively to be pressed in axial direction against a step 21, 22 provided in the central range of the recess 4. This pressing action can be effected respectively by two pressing screws 20 which end in a transverse groove 19 on the outer broad side of the blade holders and extend in the tool head 5 at an incline to the recess 4.

For obtaining a simple design of the tool, the step 21, 22 provided in the central range of the recess 4 comprises an abutment surface for the inner end 24 of the blade holders 8 and 9. The abutment surface 23 is adjacent to the clamping surface 6, 7 and extends at a right angle thereto. This abutment surface 23, can similar to the clamping surface 6, 7, easily be ground or honed to secure a precise fitting for the blade holders 8 and 9.

A particularly good locking of the blade holders 8, 9 is realized by the fact that the transverse groove 19 of each blade holder 8, 9 has two confining surfaces 25, 26 which are inclined relative to the clamping surface 6, 7 by an angle of 45°. Furthermore for the same purpose and in addition to the just mentioned feature, the two pertaining pressing screws 20 extend at a right angle toward the confining surface 25 which is closer to the inner end 24 of the blade holders 8, 9. The transverse groove 19 of each blade holder 8, 9, is located close to the inner end 24 of the blade holders 8, 9 and in spaced relationship to the oblong hole 15 for the clamping screw 16 so that the pressing screws 20 will simultaneously serve as extremely effective aid for the clamping effect of clamping screw 16.

The recess 4 of the tool head 5 divided in a fork-like manner, which extends transverse to the tool axis 3, has an end 27 designed as a bore. This end 27 is wider than the recess formed by the two steps 21 and 22 whereby the danger of breakage is reduced while the clamping action of tool head 5 is improved and at the same time the manufacture of the tool is facilitated.

Also the two plate-shaped blade holders 8 and 9 can be produced with less parts and at reduced costs. These blade holders 8 and 9 have for obtaining a wide adjusting range integrally connected thereto an outer section 28 which is narrower than the tool head 5 and projects from the end face thereof while being located on opposite sides of the tool axis. For further increasing the adjusting range to achieve narrow groove widths, each narrow section has a recess 29 for the head of an adjacent blade holding screw 13. The tool head 5 is provided with a ground or honed cylindrical mantle surface 30 for receiving an adjusting ring 32. This ring 32 is one each of two opposite side provided with adjusting screws 31 extending opposite to each other for each of the two blade holders 8 and 9. The adjusting ring 32 which greatly facilitates the positioning of the blade holders 8 and 9 has a separating gap 33 defined by two clamping jaws 34 and 35 which are interconnected by a clamping screw 36. When the adjusting ring 32 is placed upon the tool head 5 and by means of the clamping screw 36 is firmly clamped against the mantle surface 30, the pressing screw 20 and the clamping screws 16 are loosened only to such an extent that the two blade holders 8 and 9 can, while overcoming a remaining resistance, each be displaced individually and sensitively by means of an adjusting screw 31 into the desired new position. The adjusting screws 31 are directed vertically toward the narrow surfaces 37 and 38 of the blade holders 8 and 9 which narrow surfaces extend at a right angle to and also adjacent to the inner end 24.

It is, of course, to be understood that the present invention is, by no means, limited to the specific showing in the drawings but also comprises any modifications within the scope of the appended claims.

What is claimed is:

1. In combination with a cutting tool, especially for forming grooves; a holder habing a shank at one end and a tool head at the other end, a diametral axial slot extending into the holder from the head end and terminating in shoulders facing the open end of the slot, a pair of blade holders in the form of plates having opposed interengaging faces and extending axially into said slot and having inner ends engaging respective ones of said shoulders and having outer ends protruding axially from the tool head, a clamp screw extending diametrally through the tool head and said plates and operable for drawing the two sides of the tool head forming the slot toward one another to clamp the said plates therebetween, a transverse groove in the outwardly facing side of each plate within the axial range of the tool head and each having a surface which inclines downwardly in the inward direction of the respective plate, and other screws threaded angularly into said head and at the inner ends engaging said surfaces to clamp the plates against said shoulders, laterally elongated apertures provided in each of said plates, said clamping screws extending through said apertures, each said plate being adapted for supporting a cutting element on the radially outer side of the axially outer end, said plates overlapping when viewed in a direction perpendicular to the planes thereof.

2. A cutting tool according to claim 1 which includes laterally elongated apertures in each said plates, said clamping screws extending through said apertures.

3. A cutting tool according to claim 1 in which each said plate is adapted for supporting a cutting element on the radially outer side of the axially outer end, said plates overlapping when viewed in a direction perpendicular to the planes thereof.

4. A cutting tool according to claim 1 in which the said clamp screw is near the axially outer end of said tool head, and the said grooves in said plates are disposed near the axially inner ends of said plates adjacent the respective shoulders abutted by the plates and axially inwardly from the clamp screw.

5. A cutting tool to claim 1 in which said axial slot in said holder terminates at the axially inner end in a diametral bore axially inwardly from said shoulders and of a greater diameter than the lateral distance between said shoulders.

6. A cutting tool in combination according to claim 1 in which each plate has a laterally elongated aperture through which the clamp screws extends, each plate extending axially outwardly from the head end of the tool and having means at the axially outer end on the radially outer side for supporting a cutting element, said axially outwardly projecting portions of said plates when viewed in a direction perpendicular to the planes thereof being narrower than the tool head.

7. A cutting tool according to claim 4 in which said other screws include a pair of laterally spaced screws for each plate positioned to engage the respective plates near the side edges of the plates.

8. In a cutting tool, especially for forming grooves; a holder having shank at one end and a tool head at the other end, a diametral axial slot extending into the holder from the head end and terminating in shoulders facing the open end of the slot, a pair of blade holders in the form of plates having opposed interengaging faces and extending axially into said slot and having inner ends engaging respective ones of said shoulders and having outer ends protruding axially from the tool head, a clamp screw extending diametrally through the tool head and said plates and operable for drawing the two sides of the tool head forming the slot toward one another to clamp the said plates therebetween, a transverse groove in the outwardly facing side of each plate within the axial range of the tool head and each having a surface which inclines downwardly in the inward direction of the respective plate, and other screws threaded angularly into said head and at the inner ends engaging said surfaces to clamp the plates against said shoulders, each plate having a laterally elongated aperture through which the clamp screw extend, each plate extending axially outwardly from the head end of the tool and having means at the axially outer end on the radially outer side for supporting a cutting element, said axially outwardly projecting portions of said plates when viewed in a direction perpendicular to the planes thereof bein narrower than the tool head, and a blade setting fixture adapted for being clamped on said head and having screw threaded abutment elements therein adapted for engagement with the side edges of said blades, sad abutment elements being adapted for adjusting said blades in the planes thereof on the holder when the said clamp screw and other screws are loosened.

* * * * *